(12) United States Patent
Sundaram et al.

(10) Patent No.: US 10,071,337 B2
(45) Date of Patent: Sep. 11, 2018

(54) INTEGRATION OF STAGED COMPLEMENTARY PSA SYSTEM WITH A POWER PLANT FOR $CO_2$ CAPTURE/UTILIZATION AND $N_2$ PRODUCTION

(71) Applicant: ExxonMobil Research and Engineering Company, Annandale, NJ (US)

(72) Inventors: Narasimhan Sundaram, Annandale, NJ (US); Hans Thomann, Bedminster, NJ (US); Edward W. Corcoran, Jr., Easton, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 137 days.

(21) Appl. No.: 15/339,972

(22) Filed: Nov. 1, 2016

(65) Prior Publication Data
US 2017/0136400 A1    May 18, 2017

Related U.S. Application Data

(60) Provisional application No. 62/256,383, filed on Nov. 17, 2015.

(51) Int. Cl.
*B01D 53/047* (2006.01)
*B01D 53/04* (2006.01)

(52) U.S. Cl.
CPC ....... *B01D 53/047* (2013.01); *B01D 53/0423* (2013.01); *B01D 2253/108* (2013.01);
(Continued)

(58) Field of Classification Search
CPC .............. B01D 53/047; B01D 53/0423; B01D 2253/105; B01D 2253/1124;
(Continued)

(56) References Cited

U.S. PATENT DOCUMENTS

| 4,271,664 A | 6/1981 | Earnest |
| 4,299,596 A | 11/1981 | Benkmann |

(Continued)

FOREIGN PATENT DOCUMENTS

| CN | 103127747 B | 10/2015 |
| EP | 0112640 A1 | 7/1984 |

(Continued)

OTHER PUBLICATIONS

Diagne et al., "Parametric Studies on CO2 Separation and Recovery by a Dual Reflux PSA Process Consisting of Both Rectifying and Stripping Sections", Industrial & Engineering Chemistry Research, Sep. 1995, pp. 3083-3089, vol. 34, Iss. 9, ACS Publications.

(Continued)

*Primary Examiner* — Frank Lawrence
(74) *Attorney, Agent, or Firm* — Joseph E. Wrkich; Andrew T. Ward

(57) ABSTRACT

Systems and methods are provided for combined cycle power generation while reducing or mitigating emissions during power generation. Recycled exhaust gas from a power generation combustion reaction can be separated using a staged complementary swing adsorption process so as to generate a high purity $CO_2$ stream while reducing/minimizing the energy required for the separation and without having to reduce the temperature of the exhaust gas. This can allow for improved energy recovery while also generating high purity streams of carbon dioxide and nitrogen.

8 Claims, 3 Drawing Sheets

(52) U.S. Cl.
CPC .............. *B01D 2253/1124* (2013.01); *B01D 2257/102* (2013.01); *B01D 2257/504* (2013.01); *B01D 2259/40028* (2013.01); *B01D 2259/40043* (2013.01)

(58) Field of Classification Search
CPC ........ B01D 2257/102; B01D 2257/504; B01D 2259/40028; B01D 2259/40043
USPC ...... 95/96–98, 100, 103, 128, 139; 110/203, 110/345; 60/783
See application file for complete search history.

(56) References Cited

U.S. PATENT DOCUMENTS

| | | | |
|---|---|---|---|
| 4,733,528 A * | 3/1988 | Pinto | C01B 3/025 252/376 |
| 4,744,803 A | 5/1988 | Knaebel | |
| 4,858,428 A | 8/1989 | Paul | |
| 5,085,764 A | 2/1992 | Meyers et al. | |
| 5,355,668 A | 10/1994 | Weil et al. | |
| 5,707,425 A | 1/1998 | D'Amico et al. | |
| 6,290,751 B1 | 9/2001 | Ragil et al. | |
| 6,610,124 B1 | 8/2003 | Dolan et al. | |
| 6,902,602 B2 | 6/2005 | Keefer et al. | |
| 7,763,099 B2 | 7/2010 | Verma et al. | |
| 8,262,773 B2 | 9/2012 | Northrop et al. | |
| 8,337,594 B2 | 12/2012 | Corma Canos et al. | |
| 8,557,218 B2 | 10/2013 | Sundaram et al. | |
| 2005/0271914 A1 | 12/2005 | Farooque et al. | |
| 2006/0065119 A1* | 3/2006 | Landrum | B01D 53/047 95/92 |
| 2009/0064653 A1 | 3/2009 | Hagen et al. | |
| 2012/0125194 A1 | 5/2012 | Caram et al. | |
| 2012/0318533 A1 | 12/2012 | Keller et al. | |
| 2013/0014484 A1 | 1/2013 | Caprile et al. | |
| 2013/0333391 A1 | 12/2013 | Sundaram et al. | |
| 2014/0230445 A1 | 8/2014 | Huntington | |
| 2014/0272613 A1 | 9/2014 | Berlowitz et al. | |
| 2017/0136402 A1* | 5/2017 | Sundaram | B01D 53/0423 |

FOREIGN PATENT DOCUMENTS

| | | |
|---|---|---|
| EP | 0212494 A1 | 3/1987 |
| EP | 0923976 A1 | 6/1999 |
| EP | 1022045 A2 | 7/2000 |
| EP | 1413546 A1 | 4/2004 |
| EP | 2220338 B1 | 7/2011 |
| WO | 2008151913 A1 | 12/2008 |
| WO | 2009120779 A2 | 10/2009 |
| WO | 2010044958 A1 | 4/2010 |
| WO | 2010147885 A1 | 12/2010 |
| WO | 2012003079 A1 | 1/2012 |
| WO | 2013062754 A1 | 5/2013 |

OTHER PUBLICATIONS

Reijers et al., "Modeling Study of the Sorption-Enhanced Reaction Process for CO2 Capture. I. Model Development and Validation", Industrial & Engineering Chemistry Research, Jun. 23, 2009, pp. 6966-6974, vol. 48, ACS Publications.

Bensaid et al., "Power and Hydrogen Co-generation from Biogas +", Energy & Fuels, Sep. 16, 2010, pp. 4743-4747, vol. 28, iss. 9, American Chemical Society.

Wright et al., "CAESAR: Development of a SEWGS model for IGCC", Energy Procedia, 2011, pp. 1147-1154, vol. 4, Elsevier, ScienceDirect.

Manzolini et al., CO2 Separation From Combined Cycles Using Molten Carbonate Fuel Cells, Journal of Fuel Cell Science and Technology, Feb. 2012, pp. 11018-1 to 11018-8, vol. 9 iss. 1, American Society of Mechanical Engineers.

PCT/US2016/059819 Invitation to Pay Additional Fees dated Feb. 17, 2017.

PCT/US2016/059907 International Search Report and Written opinion dated Feb. 10, 2017.

PCT/US2016/059822 International Search Report and Written opinion dated Jan. 31, 2017.

PCT/US2016/059911 International Search Report and Written opinion dated Jan. 25, 2017.

PCT/US2016/059916 Invitation to Pay Additional Fees dated Feb. 9, 2017.

PCT/US2016/059912 International Search Report and Written opinion dated Feb. 8, 2017.

\* cited by examiner

INTEGRATION OF STAGED COMPLEMENTARY PSA SYSTEM WITH A POWER PLANT FOR $CO_2$ CAPTURE/UTILIZATION AND $N_2$ PRODUCTION

CROSS-REFERENCE TO RELATED APPLICATIONS

This application claims priority to U.S. Provisional Application Ser. No. 62/256,383 filed on Nov. 17, 2015, herein incorporated by reference in its entirety.

FIELD

In various aspects, the invention is related to low emission power production with separation and/or capture of resulting emissions.

BACKGROUND

Capture of gases emitted from power plants is an area of increasing interest. Power plants based on the combustion of petroleum products generate carbon dioxide as a by-product of the reaction. Historically this carbon dioxide has been released into the atmosphere after combustion. However, it is becoming increasingly desirable to identify ways to find alternative uses for the carbon dioxide generated during combustion.

Combined cycle power plants provide an efficient way to generate electricity from the burning of petroleum products or other carbon-based fuels. Combined cycle power plants can leverage an initial combustion reaction to power multiple turbines for generation of electricity, leading to more efficient power generation. However, conventional methods for capturing carbon dioxide tend to reduce the efficiency of electricity generation, due to the additional energy required to capture and/or sequester the carbon dioxide.

PCT International Publication No. WO/2012/003079 describes systems and methods for generating electricity using a combined cycle power plant based on combustion of carbon-based fuels. The systems and methods include use of stoichiometric ratios of fuels to oxygen in the combustion reaction as well as recycling of combustion exhaust gas as part of the input to the combustion reaction. The combustion products are withdrawn from the system as a purge gas stream. The $CO_2$ in the purge gas stream is removed, for example, using a solvent such as potassium carbonate.

U.S. Pat. No. 6,902,602 describes methods for performing separations by swing adsorption where it is desirable to minimize or avoid interaction between one of the components in a gas stream being separated and a component of the gas stream used for purging the swing adsorption apparatus. Separations of hydrogen and carbon dioxide from syngas stream are noted as an example, where it is desirable to avoid contamination of the hydrogen product stream with any oxygen from the typical oxygen-containing purge stream. The separation methods include use of one or more buffer gas steps during a separation, where a buffer different from any other components is used to prevent contamination between steps of a separation process.

U.S. Published Patent Application No. 2012/0125194 describes an autothermal cycle for $CO_2$ capture. A combustion exhaust gas is contacted with an adsorbent bed to adsorb $CO_2$. The $CO_2$ is then removed by contacting the adsorbent with a gas comprising steam. The resulting output gas containing steam and $CO_2$ is conveyed to a vapor recompression system to recover $H_2O$, $CO_2$, and heat. The recovered $H_2O$ and heat are then used to provide steam for the sweep gas. The amount of steam sweep gas required for recovery of $CO_2$ is described as being ~1 mole of steam per mole of input feed gas. The flue gas input feeds are described as having a $CO_2$ content of 15 mol % or less. Thus, the steam/$CO_2$ molar ratio is described as being at least ~6 moles of steam per mole of $CO_2$. The process is described as recovering at least 90% of the carbon in the combustion exhaust gas as part of the output gas.

U.S. Published Patent Application No. 2013/033391 A1 describes a system reducing or mitigating emissions during power generation. The system uses the recycled exhaust gas from a power generation combustion reaction and separates it using a swing adsorption process so as to generate a high purity $CO_2$ stream. This in turn reduces the energy required for the separation, without having to reduce the temperature of the exhaust gas. However, the processes described in this application have several drawbacks. The pressure swing adsorption process requires removing $CO_2$ from the adsorbent bed using a steam purge, however, this process takes away steam which would otherwise be used as energy in the main combustion cycle. Additionally the removed $CO_2$ in this cycle has a pressure of only 1.0 to 3.0 bar. $CO_2$ kept at such a low pressure takes up a lot more volume than $CO_2$ kept at a higher pressure, and thus this system has a high footprint as it requires more piping and the like to store and move the low pressure $CO_2$. Further, the cryogenically storing of $CO_2$ typically requires bringing the pressure of the $CO_2$ to 100 bar. Thus it is more energy intensive to cryogenically store the $CO_2$ of this system than it would be if the pressure outputted was higher. Also, the steam purge used in this system places corrosive stress on the piping used to carry out the PSA process.

Other potentially relevant publications can include U.S. Patent Application Publication No. 20120318533, European Patent Application No. EP 2220338, an article by Reijers et al., *Ind. Eng. Chem. Res.*, 2009, 48, 6966, and an article by Wright et al., *Energy Procedia*, 2011, 4, 1457, inter alia.

SUMMARY

Embodiments of the present invention are directed toward a method for improving power generation efficiency, comprising: generating power by combusting fuel and producing an exhaust gas, wherein the exhaust gas includes nitrogen and carbon dioxide, passing the exhaust gas into a complementary staged swing adsorption reactor comprising at least one nitrogen adsorbent column, and at least one carbon dioxide adsorbent column; feeding the exhaust gas into at least one of the nitrogen adsorbent column and at least one of the carbon dioxide columns at an exhaust gas feeding pressure adsorbing simultaneously: the nitrogen from the exhaust gas in an adsorption cycle of the at least one nitrogen adsorbent column, and the carbon dioxide from the exhaust gas in an adsorption cycle of the at least one carbon dioxide adsorbent column, depressurizing the one of the at least one nitrogen adsorbent column and the at least one carbon dioxide adsorbent column from exhaust gas feeding pressure to a first intermediate pressure; purging another one of the at least one nitrogen adsorbent column and the at least one carbon dioxide adsorbent column while pressurized at a second intermediate pressure; connecting the at least one nitrogen adsorbent column and the at least one carbon dioxide adsorbent column, and aligning the adsorption cycle of the at least one carbon dioxide adsorbent column with the adsorption cycle of the at least one nitrogen adsorbent column so that the first intermediate pressure and the second intermediate pressure become substantially equal.

The invention may be embodied by numerous other devices and methods. The description provided herein, when taken in conjunction with the annexed drawings, discloses examples of the invention. Other embodiments, which incorporate some or all steps as taught herein, are also possible.

DETAILED DESCRIPTION OF THE EMBODIMENTS

Figure 1:
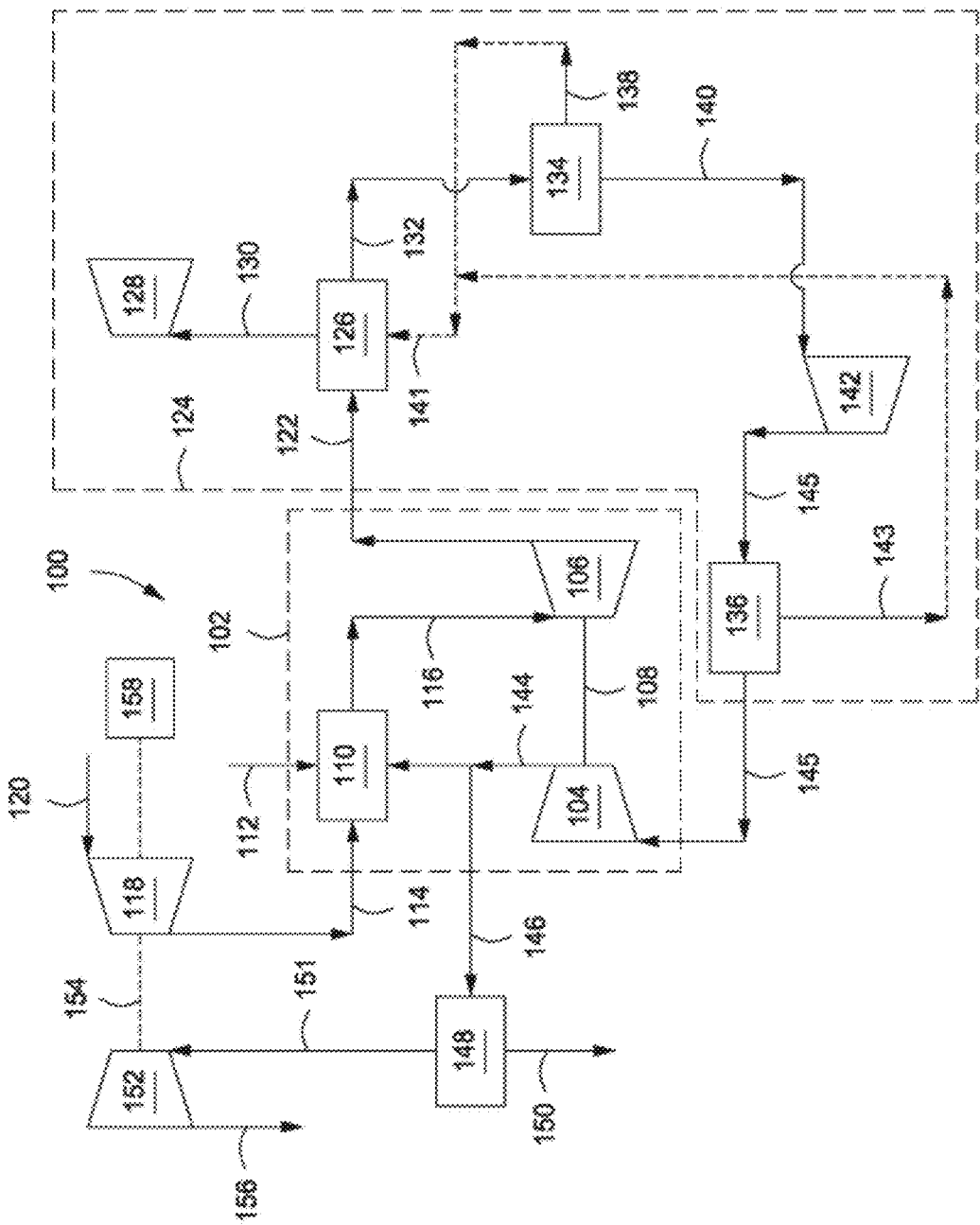
FIG. 1 schematically shows an example of a combined cycle system for generating electricity based on combustion of a carbon-based fuel.

In various aspects, systems and methods are provided for power generation using turbines while reducing and/or mitigating emissions during power generation. In a combined cycle generation system, the flue gas from a combustion reaction for a gas turbine can also be used to power a steam turbine. The flue gas can then be recycled for use as part of the input to the gas turbine. A portion of the recycled exhaust gas can be effectively separated to generate a high purity carbon dioxide stream, while reducing and/or minimizing the energy required for the separation, and without needing to reduce the temperature of the flue gas. This can allow another (e.g., the remaining) portion of the recycled exhaust gas, which can typically be composed of a majority of nitrogen, to be used to generate additional electricity, e.g., without having to adjust the pressure and/or temperature of the recycled exhaust gas to accommodate the conditions required for the carbon dioxide separation process. Thus, improved energy recovery can be realized from the combined cycle system, while also generating relatively high purity streams of carbon dioxide and nitrogen.

A variety of system configuration and processing conditions can contribute to power generation with low emissions that can also be effectively separated and/or captured for further use. For example, the input gas flow for the combustor to the gas turbine can be selected to have a desirable composition, e.g., a roughly stoichiometric ratio of fuel to oxygen. Having a roughly stoichiometric ratio of fuel to oxygen can reduce the amount of unreacted oxygen present in the gas output after combustion. This can facilitate separation of the other combustion products, as well as potentially reducing/eliminating the production of $NO_x$ species. More generally, a roughly stoichiometric combustion reaction with a desirable feed can result in an exhaust primarily composed of $CO_2$, $N_2$, and $H_2O$.

Another example of a system configuration and/or process condition that can contribute to power generation with low emission that can be effectively separated and/or captured can include using recycled exhaust gas as part of the input gas flow. The gas flow exiting the combustion process can advantageously be used to power a gas turbine. After powering the gas turbine, this gas flow corresponds to an exhaust gas. This exhaust gas can be used in a combined cycle configuration power a steam turbine by using a heat exchanger to extract heat from the exhaust gas. This exhaust gas can then be recycled, after removal of water, for use as part of the input gas flow. The exhaust gas can advantageously have an elevated volume percentage of $CO_2$ relative to ambient air, which can also assist in selecting the $CO_2$ content of the input gas flow to the combustion reaction. Controlling the amount of $CO_2$ in the combustion products can be beneficial for enhancing the energy output captured from the combustion reaction.

Recycling all of the exhaust gas can allow for all of the carbon in the exhaust to be maintained in a single stream until the stream can be diverted to a carbon capture process. Typically, though, less than all of the recycled exhaust gas may be needed to provide additional gas for the input gas flow to combustion. As a result, any excess exhaust gas can be diverted, e.g., for separation into high purity $CO_2$ and $N_2$ gas streams. A convenient location in the process to perform this diversion can be after the recycled exhaust gas has been modified to achieve the temperature and pressure desired for the input gas flow to combustion. At this point, it can be desirable to perform the separation of $CO_2$ and $N_2$ while reducing/minimizing the amount of energy lost due to temperature/pressure reductions. For example, typical solvent methods for separating $CO_2$ and $N_2$ require a reduction in the temperature of the recycled exhaust gas. For such conventional solvent methods, in order to preserve as much energy in the $N_2$ stream as possible, heat exchangers can be used to transfer heat from the recycled exhaust gas to the separated $N_2$ stream.

In some aspects, the separation of $CO_2$ and $N_2$ can be performed by using a pressure swing adsorption (PSA) process to separate the $CO_2$ and $N_2$ at the temperature and pressure of the input gas flow to the combustion reaction. Using pressure swing adsorption to perform the separation can allow for recovery, for example, of at least about 60% (such as at least about 65%, at least about 70%, at least about 75%, at least about 80%, at least about 85%, at least about 90%, at least about 95%, at least about 97%, at least about 98%, at least about 99%, at least about 99.3%, or at least about 99.5%) of the $CO_2$ in the recycled exhaust gas, e.g., while also generating an $N_2$ stream with at least about 90% purity (such as at least about 93% purity, at least about 95% purity, at least about 97% purity, at least about 98% purity, or at least about 99% purity) and/or a $CO_2$ stream with at least about 80% purity (such as at least about 85% purity, at least about 90% purity, at least about 95% purity, at least about 97% purity, at least about 98% purity, at least about 99% purity, at least about 99.3% purity, or at least about 99.5% purity).

In various aspects, the operating conditions for a PSA reactor can be selected to facilitate the power generation process while still effectively capturing the exhaust gases. Using a relatively high temperature PSA can preserve the energy content of the $N_2$ portion of the recycled exhaust gas, so that the $N_2$ gas stream can be used to power an additional turbine for electricity generation. By contrast, a conventional separation method for $CO_2$ separation such as solvent separation can typically require adjustment of the temperature and/or pressure of the stream to facilitate the separation. Thus, instead of requiring energy to modify the recycled exhaust prior to treating the exhaust gases, use of a PSA reactor can allow the capture process to be adjusted to match the operating conditions for power generation.

The high temperature PSA can also be performed using a process cycle avoiding the need for high temperature steam and/or another energy intensive purge gas. This can allow high purity $CO_2$ to be recovered while reducing/minimizing the amount of energy lost to capture of the exhaust gases.

Combined Cycle Process for Power Generation with Low Emissions

In various aspects, systems and methods are provided for generating power while controlling and/or capturing the emissions produced during power generation. One goal of power generation is to use input feeds (such as fuels) as efficiently as possible, so that power generation can be increased/optimized for a given amount of fuel and/or of equipment. Based on the conditions for effective power generation, a goal for control/capture of emissions can be to provide effective capture of emissions while reducing/minimizing the changes to the conditions for power generation.

As used herein, the term "stoichiometric combustion" refers to a combustion reaction having a volume of reactants comprising a fuel and an oxidizer and a volume of products formed by combusting the reactants, where substantially the entire volume of the reactants is used to form the products. As used herein, the term "substantially stoichiometric combustion" refers to a combustion reaction having a molar ratio of combustion fuel to oxygen ranging from plus to minus about 10%, e.g., from about plus to minus about 5%, of the oxygen required for a stoichiometric ratio. For example, the stoichiometric ratio of fuel to oxygen for methane is 1:2 ($CH_4+2O_2 \leftrightarrow CO_2+2H_2O$), whereas propane should have a stoichiometric ratio of fuel to oxygen of 1:5. Another way of measuring substantially stoichiometric combustion can be as a ratio of oxygen supplied to oxygen required for stoichiometric combustion, e.g., from about 0.9:1 to about 1.1:1 or from about 0.95:1 to about 1.05:1.

In some aspects, the processes described herein can be used to produce ultra low emission electric power and $CO_2$ for enhanced oil recovery (EOR), enhanced hydrocarbon recovery (EHR), and/or sequestration/capture applications; in such cases, the process conditions for EOR/EHR may be similar to sequestration/capture application or may be slightly different. In one or more aspects, a mixture of oxygen-enriched gas (e.g., enriched air) and fuel can be stoichiometrically or substantially stoichiometrically combusted and simultaneously mixed with a stream of recycled exhaust gas. The stream of recycled exhaust gas, generally including products of combustion such as $CO_2$, can be used as a diluent to control, adjust, and/or otherwise moderate the temperature of combustion and the exhaust that enters the succeeding expander. As a result of using oxygen enrichment, the recycled exhaust gas can have an increased $CO_2$ content, thereby allowing the expander to operate at even higher expansion ratios for the same inlet and discharge temperatures, thereby producing significantly increased power.

Combustion in commercial gas turbines at stoichiometric conditions or substantially stoichiometric conditions (e.g., "slightly rich" combustion) can prove advantageous to eliminate the cost of excess oxygen removal. By cooling the exhaust and condensing the water out of the cooled exhaust stream, a relatively high content $CO_2$ exhaust stream can be produced. While a portion of the recycled exhaust gas can be utilized for temperature moderation in a closed Brayton cycle, a remaining purge stream can be used for EOR and/or enhanced hydrocarbon recovery applications and/or electric power can be produced with little or no sulfur oxides ($SO_x$), nitrogen oxides ($NO_x$), and/or $CO_2$ being emitted to the atmosphere. The result of this process can include the production of power in three separate cycles and the manufacturing of additional $CO_2$. In some aspects, performing stoichiometric combustion can allow for generation of an exhaust stream consisting substantially of $CO_2$, $H_2O$, and $N_2$. An exhaust stream consisting substantially of $CO_2$, $H_2O$, and $N_2$ is defined as an exhaust stream that contains about 5 mol % or less of other gas molecules, e.g., about 2.5 mol % or less or about 1 mol % or less.

FIG. 1 depicts a schematic of an illustrative integrated system 100 for power generation and $CO_2$ recovery using a combined-cycle arrangement, according to one or more embodiments. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, and/or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel introduced via line 112 mixed with an oxidant introduced via line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof. The oxidant via line 114 can be derived from a second or inlet compressor 118 fluidly coupled to the combustion chamber 110 and adapted to compress a feed oxidant introduced via line 120. In one or more embodiments, the feed oxidant in line 120 can include atmospheric air, enriched air, or combinations thereof. When the oxidant in line 114 includes a mixture of atmospheric air and enriched air, the enriched air can be compressed by the inlet compressor 118 before and/or after being mixed with the atmospheric air. The enriched air can have an overall oxygen concentration of at least about 30 vol %, e.g., at least about 35 vol %, at least about 40 vol %, at least about 45 vol %, at least about 50 vol %, from about 30 vol % to about 70 vol %, from about 30 vol % to about 65 vol %, from about 30 vol % to about 60 vol %, from about 30 vol % to about 55 vol %, from about 30 vol % to about 50 vol %, from about 35 vol % to about 70 vol %, from about 35 vol % to about 65 vol %, from about 35 vol % to about 60 vol %, from about 35 vol % to about 55 vol %, from about 35 vol % to about 50 vol %, from about 40 vol % to about 70 vol %, from about 40 vol % to about 65 vol %, from about 40 vol % to about 60 vol %, from about 40 vol % to about 55 vol %, from about 40 vol % to about 50 vol %, from about 45 vol % to about 70 vol %, from about 45 vol % to about 65 vol %, from about 45 vol % to about 60 vol %, from about 45 vol % to about 55 vol %, from about 45 vol % to about 50 vol %, from about 50 vol % to about 70 vol %, from about 50 vol % to about 65 vol %, or from about 50 vol % to about 60 vol %.

The enriched air can be derived from any one or more of several sources, including implementing various technologies upstream of the inlet compressor 118 to produce the enriched air. For example, the enriched air can be derived from such separation technologies as membrane separation, pressure swing adsorption, temperature swing adsorption, nitrogen plant-byproduct streams, and/or combinations thereof. The enriched air can additionally or alternately be derived from an air separation unit (ASU), such as a cryogenic ASU, for producing nitrogen for pressure maintenance or other purposes. The reject stream from the ASU can be rich in oxygen, e.g., having an overall oxygen content from about 50 vol % to about 70 vol %. This reject stream can be used as at least a portion of the enriched air and subsequently diluted, if needed, with unprocessed atmospheric air to obtain the desired oxygen concentration for the application.

As will be described in more detail below, the combustion chamber 110 can also receive a compressed recycle exhaust gas in line 144, including an exhaust gas recirculation primarily having $CO_2$ and nitrogen components. The compressed recycle exhaust gas in line 144 can be derived from the main compressor 104 and adapted to help facilitate a stoichiometric or substantially stoichiometric combustion of the compressed oxidant in line 114 and fuel in line 112 by moderating the temperature of the combustion products. As can be appreciated, recirculating the exhaust gas can serve to increase the $CO_2$ concentration in the exhaust gas.

An exhaust gas in line 116 directed to the inlet of the expander 106 can be generated as a product of combustion of the fuel in line 112 and the compressed oxidant in line 114, in the presence of the compressed recycle exhaust gas in line 144. In at least one embodiment, the fuel in line 112 can be primarily natural gas, thereby generating a discharge or exhaust gas via line 116 that can include volumetric portions of vaporized water, $CO_2$, nitrogen, nitrogen oxides ($NO_x$), and sulfur oxides ($SO_x$). In some embodiments, a small portion of unburned fuel in line 112 or other compounds can also be present in the exhaust gas in line 116 due to combustion equilibrium limitations. As the exhaust gas in line 116 expands through the expander 106, it can generate mechanical power to drive the main compressor 104, an electrical generator, and/or other facilities, and can also produce a gaseous exhaust in line 122 having a heightened $CO_2$ content resulting from the influx of the compressed recycle exhaust gas in line 144. In some implementations, the expander 106 may be adapted to produce additional mechanical power that may be used for other purposes.

Additionally or alternately, the power generation system 100 can include an exhaust gas recirculation (EGR) system 124, which can include a heat recovery steam generator (HRSG) 126, or similar device, fluidly coupled to a steam gas turbine 128. In at least one embodiment, the combination of the HRSG 126 and the steam gas turbine 128 can be characterized as a power-producing closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust in line 122 can be introduced to the HRSG 126 in order to generate steam via line 130 and a cooled exhaust gas in line 132. Additionally or alternately, the steam in line 130 can be sent to the steam gas turbine 128 to generate additional electrical power.

The cooled exhaust gas in line 132 can be sent to a first cooling unit 134 adapted to cool the cooled exhaust gas in line 132 and generate a cooled recycle gas stream 140. The first cooling unit 134 can include, for example, one or more contact coolers, trim coolers, evaporative cooling unit, or any combination thereof. The first cooling unit 134 can additionally or alternately be adapted to remove a portion of any condensed water from the cooled exhaust gas in line 132 via a water dropout stream 138. In at least one embodiment, the water dropout stream 138 may be routed to the HRSG 126 via line 141 to provide a water source for the generation of additional steam in line 130 therein. Additionally or alternately, the water recovered via the water dropout stream 138 can be used for other downstream applications, such as supplementary heat exchanging processes.

In most embodiments, the cooled recycle gas stream 140 can be directed to a boost compressor 142. Cooling the cooled exhaust gas in line 132 in the first cooling unit 134 can reduce the power required to compress the cooled recycle gas stream 140 in the boost compressor 142. As opposed to a conventional fan or blower system, the boost compressor 142 can be configured to compress, and thus increase, the overall density of the cooled recycle gas stream 140, thereby directing a pressurized recycle gas in line 145 downstream, where the pressurized recycle gas in line 145 can thus exhibit an increased mass flow rate for the same volumetric flow. This can prove advantageous, since the main compressor 104 can be volume-flow limited, and directing more mass flow through the main compressor 104 can result in higher discharge pressures, thereby translating into higher pressure ratios across the expander 106. Higher pressure ratios generated across the expander 106 can allow for higher inlet temperatures and, therefore, an increase in expander 106 power and/or efficiency. As can be appreciated, this may prove advantageous, since the $CO_2$-rich exhaust gas in line 116 can generally maintain a higher specific heat capacity.

Since the suction pressure of the main compressor 104 can typically be a function of its suction temperature, a cooler suction temperature can generally demand less power to operate the main compressor 104 for the same mass flow. Consequently, the pressurized recycle gas in line 145 can optionally be directed to a second cooling unit 136, e.g., which can include one or more direct contact coolers, trim coolers, evaporative cooling units, or any combination thereof. In at least one embodiment, the second cooling unit 136 can serve as an aftercooler adapted to remove at least a portion of the heat of compression generated by the boost compressor 142 on the pressurized recycle gas in line 145. The second cooling unit 136 can additionally or alternately extract additional condensed water via a water dropout stream 143. In some such embodiments, the water dropout streams 138,143 can converge into stream 141 and may or may not be routed to the HRSG 126 to generate additional steam via line 130 therein. While only first and second cooling units 134,136 are depicted herein, any desired number of cooling units can be employed to suit a variety of applications, without departing from the scope of the disclosure.

The main compressor 104 can be configured to receive and compress the pressurized recycle gas in line 145 to a pressure nominally at or above the pressure of the combustion chamber 110, thereby generating the compressed recycle exhaust gas in line 144. As can be appreciated, cooling the pressurized recycle gas in line 145 in the second cooling unit 136 after compression in the boost compressor 142 can allow for an increased volumetric mass flow of exhaust gas into the main compressor 104. Consequently, this can reduce the amount of power required to compress the pressurized recycle gas in line 145 to a predetermined pressure.

In many embodiments, a purge stream 146 can be recovered from the compressed recycle exhaust gas in line 144 and subsequently treated in a $N_2/CO_2$ separator 148 to capture $CO_2$ at an elevated pressure via line 150. Preferably, the $N_2/CO_2$ separator can be a pressure swing adsorption unit, as described in further detail below. The separated $CO_2$ in line 150 can be used for sales, used in another processes requiring $N_2$ or $CO_2$, and/or further compressed and injected into a terrestrial reservoir for enhanced oil recovery (EOR), enhanced hydrocarbon recovery (EHR), sequestration, or another purpose. Because of the stoichiometric or substantially stoichiometric combustion of the fuel in line 112 combined with a boosted pressure from the boost compressor 142, the $CO_2$ partial pressure in the purge stream 146 can be much higher than in conventional gas turbine exhausts.

A residual stream 151, essentially depleted of $CO_2$ and consisting primarily of nitrogen, can additionally or alternately be derived from the $CO_2$ separator 148. In some embodiments, the residual stream 151 can be introduced to a gas expander 152 to provide power and an expanded depressurized gas, or exhaust gas, via line 156. The expander 152 can be, for example, a power-producing nitrogen expander. As depicted, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. However, during startup of the system 100 and/or during normal operation, when the gas expander 152 is unable to supply all the required power to operate the inlet compressor 118, at least one motor 158, such as an electric motor, can be used synergistically with the gas expander 152. For instance, the motor 158 can be sensibly sized such that, during normal operation of the system 100, the motor 158 can be configured to supply the power short-fall from the gas expander 152. In other embodiments, however, the gas expander 152 can be used to provide power to other applications, and not directly coupled to the inlet compressor 118. For example, there may be a substantial mismatch between the power generated by the expander 152 and the requirements of the compressor 118. In such cases, the expander 152 could be adapted to drive a smaller (or larger) compressor (not shown) that may demand less (or more) power.

An expanded depressurized gas in line 156, primarily consisting of dry nitrogen gas, can be discharged from the gas expander 152. In at least one embodiment, the combination of the gas expander 152, inlet compressor 118, and $CO_2$ separator 148 can be characterized as an open Brayton cycle, and/or a third power-producing component of the power generation system 100. Conventional systems and methods of expanding the nitrogen gas in the residual stream 151, and variations thereof, are believed to be known in the art and are thus not discussed herein.

Additionally or alternately, gas expander 152 can be replaced and/or complemented with a downstream compressor 158. At least a portion (and up to all) of the residual stream 151 can be compressed in a downstream compressor to generate a compressed exhaust gas via line 160, which can be suitable for injection into a reservoir for pressure maintenance applications. In applications where methane gas is typically reinjected into hydrocarbon wells to maintain well pressures, compressing the residual stream 151 may prove advantageous. For example, the pressurized nitrogen gas in line 160 can instead be injected into the hydrocarbon wells, and any residual methane gas can be sold or otherwise used as fuel in related applications, such as in line 112.

By using enriched air as the compressed oxidant in line 114 and pressurizing the exhaust gas in the boost compressor 142, the power generation system 100 can achieve higher concentrations of $CO_2$ in the exhaust gas, thereby allowing for more effective $CO_2$ separation and capture. Embodiments disclosed herein, for example, can effectively increase the concentration of $CO_2$ in the exhaust gas in line 116 to $CO_2$ concentrations ranging from about 10 vol % to about 20 vol %. To achieve such $CO_2$ concentrations, the combustion chamber 110 can be adapted to stoichiometrically or substantially stoichiometrically combust an incoming mixture of fuel in line 112 and compressed oxidant in line 114, where the compressed oxidant in line 114 can include a stream having an oxygen content greater than about 21 vol %, e.g., enriched air, such as having an overall oxygen concentration of about 30 vol %, about 35 vol %, about 40 vol %, about 45 vol %, or about 50 vol %.

In order to moderate the temperature of the stoichiometric combustion and meet expander 106 inlet temperature and component cooling requirements, a portion of the exhaust gas with increased $CO_2$ content derived from the compressed recycle exhaust gas in line 144 can be injected into the combustion chamber 110 as a diluent. Thus, embodiments of the disclosure can essentially eliminate excess oxygen from the exhaust gas in line 116, while advantageously increasing its $CO_2$ concentration, e.g., up to about 20 vol % or optionally higher. As such, the gaseous exhaust in line 122 can have less than about 3.0 vol % oxygen, for example less than about 1.0 vol % oxygen, less than about 0.1 vol % oxygen, or less than about 0.01 vol % oxygen.

At least one benefit of having an increased $CO_2$ concentration can be that the expander 106 can be operated at an even higher expansion ratio for the same inlet and discharge temperatures, and can thereby produce increased power. This can be due to the higher heat capacity of $CO_2$ relative to nitrogen found in ambient air. In one or more aspects, the expansion ratio of the expander 106 can be increased from about 17.0 to about 20.0, corresponding to about 10 vol % and about 20 vol % $CO_2$ recycle streams, respectively. For example, enriched air having about 35 vol % oxygen can be used in order to achieve the about 20 vol % in the $CO_2$ recycle stream.

Additional or alternate benefits of having an increased $CO_2$ concentration in the recycle gas can include, but are not limited to, an increased concentration of $CO_2$ in the extracted purge stream 146 used for $CO_2$ separation. Because of its increased $CO_2$ concentration, the purge stream 146 need not be as large in order to extract the required amounts of $CO_2$. For example, the equipment handling extraction for $CO_2$ separation can be smaller, including its piping, heat exchangers, valves, absorber towers, etc. Moreover, increased concentrations of $CO_2$ can improve the performance of $CO_2$ removal technology, including using low-energy separation processes, such as employing less energy-intensive solvents that would otherwise be untenable. Consequently, capital expenditures for capturing $CO_2$ can be dramatically lowered.

An example of operation of the system 100 will now be discussed. As should be appreciated, specific temperatures and pressures achieved/experienced in the various components of any of the embodiments disclosed herein can change depending on, among other factors, the purity of the oxidant used and/or the specific makes and/or models of expanders, compressors, coolers, etc. Accordingly, it should be appreciated that the particular data described herein is for illustrative purposes only and should not be construed as the only interpretation thereof. In an embodiment, the inlet compressor 118 can provide compressed oxidant in line 114 at a pressure between about 280 psia (about 1.9 MPaa) and about 300 psia (about 2.1 MPaa). Also contemplated herein, however, is aeroderivative gas turbine technology, which can produce and consume pressures of up to about 750 psia (about 5.2 MPaa) and higher.

The main compressor 104 can be configured to recycle and compress recycled exhaust gas into the compressed recycle exhaust gas in line 144 at a pressure nominally at or above the combustion chamber 110 pressure, and to use a portion of that recycled exhaust gas as a diluent in the combustion chamber 110. Because amounts of diluent needed in the combustion chamber 110 can depend on the purity of the oxidant used for stoichiometric combustion or the particular model/design of expander 106, a ring of thermocouples and/or oxygen sensors (not shown) can be disposed on the outlet of the expander 106. In operation, the thermocouples and/or sensors can be adapted to regulate and determine the volume of exhaust gas required as diluent needed to cool the products of combustion to the required expander inlet temperature, and also to provide feedback to regulate the amount of oxidant being injected into the combustion chamber 110. Thus, in response to the heat requirements detected by the thermocouples and/or the oxygen levels detected by the oxygen sensors, the volumetric mass flow of compressed recycle exhaust gas in line 144 and compressed oxidant in line 114 can be manipulated up or down to track the demand.

In at least one embodiment, a pressure drop of about 12-13 psi (about 83-90 kPa) can be experienced across the combustion chamber 110 during stoichiometric or substantially stoichiometric combustion. Combustion of the fuel in line 112 and the compressed oxidant in line 114 can generate temperatures between about 2000° F. (about 1093° C.) and about 3000° F. (about 1649° C.) and pressures ranging from about 250 psia (about 1.7 MPaa) to about 300 psia (about 2.1 MPaa). As described above, because of the increased mass flow and higher specific heat capacity of the $CO_2$-rich exhaust gas derived from the compressed recycle exhaust gas in line 144, higher pressure ratios can be achieved across the expander 106, thereby allowing for higher inlet temperatures and increased expander 106 power.

The gaseous exhaust in line 122 exiting the expander 106 can exhibit pressures at or near ambient, e.g., about 13-17 psia (about 90-120 kPaa). The temperature of the gaseous exhaust in line 122 can be from about 1225° F. (about 663° C.) to about 1275° F. (about 691° C.) before passing through the HRSG 126 to generate steam in line 130 and a cooled exhaust gas in line 132. In one or more embodiments, the cooling unit 134 can reduce the temperature of the cooled exhaust gas in line 132, thereby generating the cooled recycle gas stream 140 having a temperature between about 32° F. (about 0° C.) and about 120° F. (about 49° C.). As can be appreciated, such temperatures can fluctuate, e.g., depending on wet bulb temperatures during specific seasons in specific locations around the globe.

According to one or more embodiments, the boost compressor 142 can be configured to elevate the pressure of the cooled recycle gas stream 140 to a pressure ranging from about 17 psia (about 120 kPaa) to about 21 psia (about 140 kPaa). As a result, the main compressor 104 can eventually receive and compress a recycled exhaust with a higher density and increased mass flow, thereby allowing for a substantially higher discharge pressure while maintaining the same or similar pressure ratio. In order to further increase the density and mass flow of the recycle exhaust gas, the pressurized recycle gas in line 145 discharged from the boost compressor 142 can then be further cooled in the optional second cooling unit 136, which can, in some embodiments, be configured to reduce the pressurized recycle gas temperature in line 145 to about 105° F. (about 41° C.) before being directed to the main compressor 104.

Additionally or alternately, the temperature of the compressed recycle exhaust gas in line 144 discharged from the main compressor 104, and consequently the temperature of the purge stream 146, can be about 800° F. (about 427° C.), with a pressure of around 280 psia (about 1.9 MPaa). The addition of the boost compressor 142 and the stoichiometric combustion of enriched air can increase the $CO_2$ purge pressure in the purge stream 146, which can lead to improved solvent treating performance in the $CO_2$ separator 148 due to the higher $CO_2$ partial pressure.

Swing Adsorber Processes—Overview

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

Multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

U.S. Pat. No. 4,744,803 discusses the use of a four-step PSA cycle. The adsorption bed is first pressurized by entry of gas from the bottom of the bed while the top end of the bed is closed. This is referred to as the pressurization step.

The next step is high pressure feed, wherein feed gas enters under pressure from the top of the column and effluent is allowed to escape from the bottom of the column. At the conclusion of this step the column is closed at both ends and the pressurized gas is then released by opening the top end of the column. This is referred to as the blow down step. After the pressure has been reduced to a predetermined level by blowdown, the column is next purged of remaining product by feeding recycled product gas into the bottom end of the bed and allowing the gas remaining in the column to be forced out of the top end as effluent. This step would normally be terminated at the point where the purging gas reaches the top end of the column. The effluents from the blowdown and purge steps contain the component adsorbed by the column. This is generally referred to as the secondary product of the column. The primary product is the component or component which pass through the bed unadsorbed, i.e., the high pressure feed effluent.

U.S. Pat. No. 4,744,803 also provides a complementary PSA system where adsorbents 1 and 2 are disposed in 4 beds, which are respectively selective for species A and B. This system uses the secondary product of one bed (the blow down and purge effluent) partially or wholly as the feed for another bed containing a different, or complementary adsorbent. This system, however, has the disadvantage that compressors are required to feed the secondary product of one feed to another. Thus greatly increasing the energy required to operate the system.

Swing Adsorber Processes—Exhaust Stream

In various aspects, a PSA reactor can be used for performing a separation on a stream containing $CO_2$ and $N_2$. An example of such a stream can include the exhaust stream from a combustion reaction for providing power for a gas turbine. Preferably, the exhaust stream can be the exhaust from a combustion reaction performed with a substantially stoichiometric composition with regard to the amount of oxygen and fuel. Prior to use as a feed for separation by PSA, the exhaust stream can undergo further processing, such as condensation to remove water, combustion to remove excess fuel, adsorption for removal of $NO_x$ species, and/or other types of processing to remove components different from $CO_2$ and $N_2$. In some aspects, the portion of the exhaust stream used as the feed for the PSA reactor can have a water content of less than about 1.0 vol %, such as less than about 0.5 vol %. Additionally or alternately, the portion of the exhaust stream used as the feed for the PSA reactor can have an O2 content of less than about 3.0 vol %, such as less than about 1.0 vol % or less than about 0.5 vol %. Further additionally or alternately, the feed into the PSA reactor can be substantially composed of $CO_2$ and $N_2$, where components of the input gas feed different from $CO_2$ and $N_2$ are present in an amount of about 1.0 vol % or less each, such as less than about 0.5 vol % each. Still further additionally or alternately, in a feed substantially composed of $CO_2$ and $N_2$, the combined vol % of components other than $CO_2$ and $N_2$ can be about 2.0 vol % or less, such as about 1.0 vol % or less or 0.5 vol % or less.

To perform a separation, a portion of the recycled exhaust stream can be introduced into a PSA reactor, such as a purge stream from the exhaust stream recycle loop. The portion of the recycled exhaust stream can be withdrawn from the exhaust recycle system at a location after the temperature and pressure of the recycled exhaust stream have been modified (and/or after desired temperature and pressure have been obtained) for use as part of the input gas flow to the combustion reaction. At such point in the recycle system, the exhaust stream can have a temperature from about 300° C. to about 600° C., e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., from about 500° C. to about 600° C. Additionally or alternately, the temperature can be at least about 325° C., e.g., at least about 350° C., at least about 400° C., at least about 425° C., or at least about 440° C. Further additionally or alternately, the temperature can be about 575° C. or less, about 550° C. or less, about 500° C. or less, about 475° C. or less, about 460° C. or less, or about 440° C. or less. Still further additionally or alternately, the pressure of the recycled exhaust stream can be at least about 10 bara (about 1.0 MPaa), e.g., at least about 15 bara (about 1.5 MPaa), at least about 20 bara (about 2.0 MPaa), at least about 25 bara (about 2.5 MPaa), or at least about 30 bara (about 3.0 MPaa). Yet further additionally or alternately, the pressure can be about 60 bara (6.0 MPaa) or less, e.g., about 50 bara (about 5.0 MPaa) or less, about 40 bara (about 4.0 MPaa) or less, about 35 bara (about 3.5 MPaa) or less, about 30 bara (about 3.0 MPaa) or less, about 25 bara (about 2.5 MPaa) or less, or about 22.5 bara (about 2.25 MPaa) or less. In some alternative aspects, other locations for withdrawing the portion of the recycled exhaust stream can be selected, so long as the withdrawn portion has similar temperature and pressure values.

In some aspects, the recycled exhaust stream can be introduced into the PSA reactor at a separation temperature and a separation pressure that can correspond to the temperature and pressure of the recycle stream. However, some variation in temperature and/or pressure may occur between withdrawal of the portion of the recycled exhaust stream from the recycle system and introduction of the recycled exhaust stream into the PSA reactor. For example, the separation temperature for the portion of the recycled exhaust stream introduced into the PSA reactor can differ from the temperature in the recycle system by about 20° C. or less, e.g., by about 15° C. or less or by about 10° C. or less. It is noted that, although having the same temperature for the separation temperature and the temperature in the recycle stream (i.e., a difference of approximately 0° C.) is included within the enumerated differences, in some rare embodiments the temperature differences can optionally exclude 0° C. Additionally or alternately, the separation pressure for the portion of the recycled exhaust stream introduced into the PSA reactor can differ from the pressure in the recycle system by about 5 bar (0.5 MPa) or less, e.g., about 2 bara (0.2 MPa) or less, about 1 bara (about 0.1 MPa) or less, or about 0.5 bar (about 50 kPa) or less.

Complementary Staged PSA System

Figure 2:
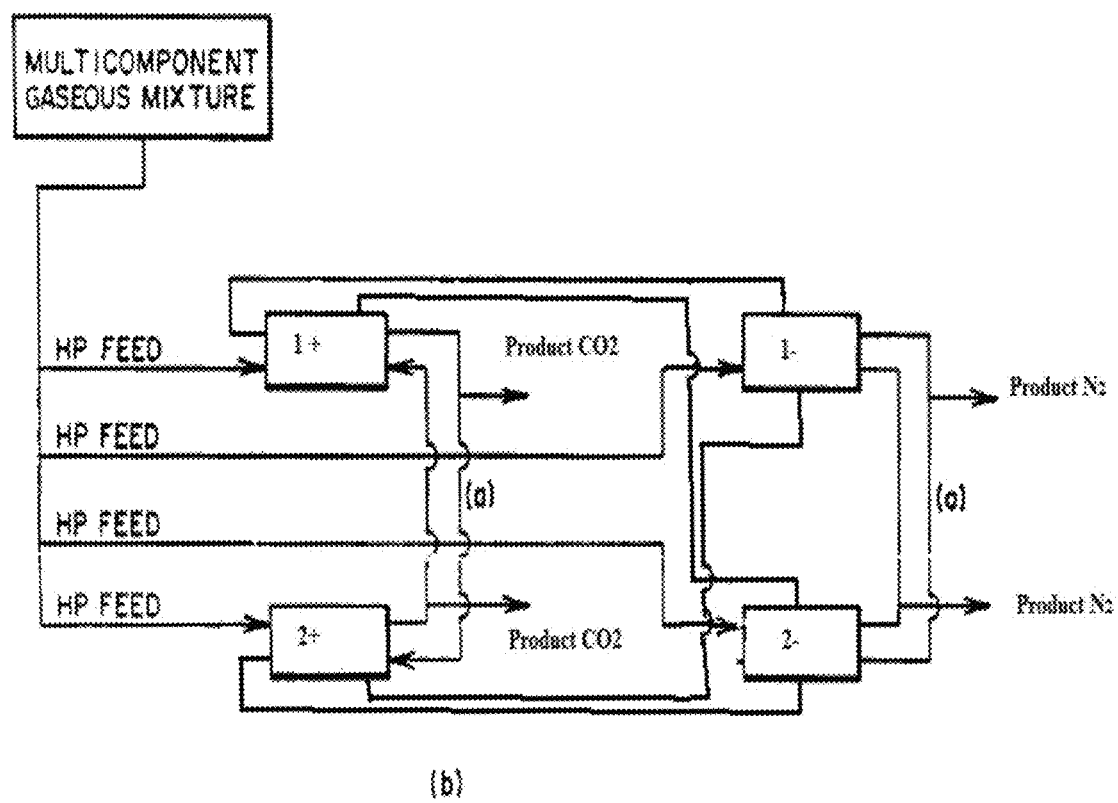
FIG. 2 schematically shows a configuration for a pressure swing adsorption process.

The complementary staged PSA system of this invention (separator 148 in FIG. 1) will now be described in FIG. 2. The PSA reactor may be comprised a four adsorbent column system, labeled (1+, 2+, 1−,2−). Two of the adsorbent columns (1+, 2+) may be selective for nitrogen, while the other two columns (1−,2−) may be selective for carbon dioxide. Each column can be hooked up to a high pressure feed line, which may output the recycled exhaust stream as previously described. When a given adsorbent column is subjected to the high pressure feed (i.e., exhaust stream), the component that the column is selective for (e.g., nitrogen or carbon dioxide) may be adsorbed, while the other component may pass through the column and can be generated and stored. Thus, a highly concentrated component may be generated this way at the pressure of the feed gas.

Columns also may be pressurized and depressurized via the connections between two different columns. For example, if column (1+) is at a high pressure, and column (1−) is at a low pressure, both columns (1+) and (1−) may be disconnected from the high feed line and connected to each other by pipes. This enables the gas pressure between the two to equalize at some intermediate pressure.

Additionally, the connections between the various columns may enable one column to be purged with the effluent of another. For example, column (1+), at low pressure, may be purged with the product of column (2+), while column (2+) is connected to the high pressure feed line at high pressure. Some of the product created from the high pressure feeding of column (2+) (i.e., $CO_2$), is used to purge column (1+) of adsorbed gas that is released from the column after it is depressurized to low pressure. The columns of this system may also be purged at an intermediate pressure as will be described hereafter. The system enables the purging of adsorbent columns without the need for an external compressor or steam gas.

An exemplary cycle of this staged complementary PSA system employs will be described in reference to FIG. 3. This cycle is used to separate $CO_2/N_2$ from an exhaust stream of this embodiment of the present invention. This separation system is advantageous for several reasons over the prior art (e.g., U.S. Patent Application No. 2013/033391 A1). First, this system does not require a steam purge to remove $CO_2$ from the adsorbent bed as will be described. Thus, the energy required to produce the steam will not be diverted away from the combustion processes in the engine and the system will be more energy efficient. Rather, this system used the high pressure product or effluent created by one column, to purge a different column at low or intermediate pressure. Second, this complementary PSA cycle creates both high-pressure (~25 bar) $CO_2$ and $N_2$ product. Thus, less piping is needed as high-pressure gas takes up less volume than low pressure gas, and consequently, the footprint of the system may be reduced. Third, less energy is needed to cryogenically store $CO_2$. Usually, cryogenically storing $CO_2$ requires pressurizing $CO_2$ to ~100 bar or higher. Thus, the higher the pressure of the produced $CO_2$, the less energy is required to reach ~100 bar or higher. Finally, this system is advantageous because purging with steam tends to corrode the metal piping used in the PSA process. Thus, the method of not purging the adsorbent columns with steam has less of a corrosive effect on the PSA system.

In this exemplary cycle, the adsorbent material of columns (1+) and (2+) is selective for $N_2$ and may be composed of 4 A, NaA zeolite or of LiX zeolite. The adsorbent material of columns (1−) and (2−) is selective for carbon dioxide and may be composed of activated carbons, aluminas, metal organic framework (MOF), mixed metal oxides, hydrotalcites, or a combination of these. The process described in reference to FIG. 3 uses no additional compression and produces an enriched carbon dioxide product containing 93.8 mol % $CO_2$ at a recovery of 70% and an $N_2$ enriched product containing 97.7 mol % $N_2$ at a recovery of 98.8%.

Figure 3:
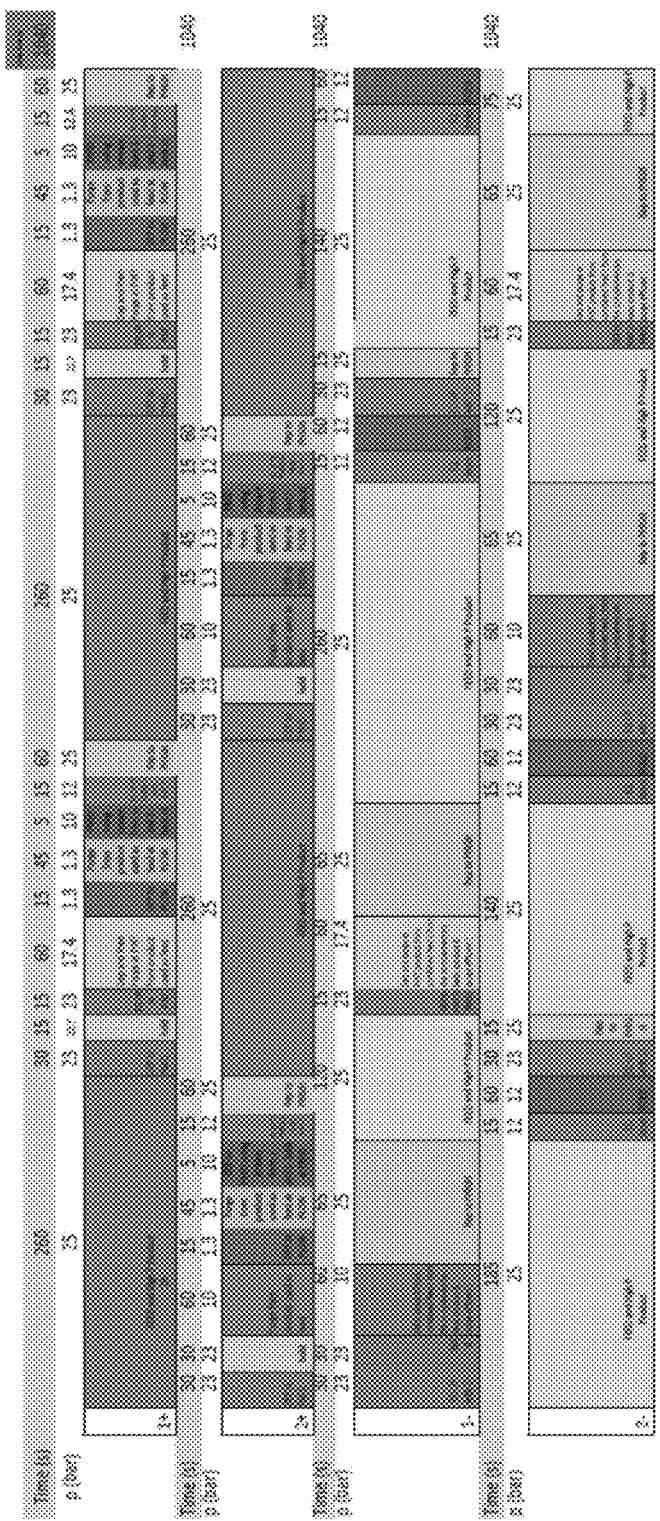
FIG. 3 shows a flow chart depicting the various stages in an exemplary cycle for a four column, staged complementary PSA system used to produce a continuous highly concentrated $CO_2$ and $N_2$ product at minimum energy cost.

In accordance with the cycle shown in FIG. 3, columns (1+) and (2+) are subjected to a feed step. The feed is composed of 10% $CO_2$ and 90% $N_2$, and is provided at a pressure of 25 bar and temperature of 250° C. at a feed rate of 630 kg/hr. Columns (1−) and (2−) are subjected to a feed step with a composition of 10% carbon dioxide and 90% $N_2$ at a pressure of 25 bar and a temperature of 250° C. at a feed rate of 350 kg/hr. Various pressures and times associated with the cycle steps are depicted in FIG. 3 and will be described hereafter.

The cycle of column (1+) will now be described. Column (1+) is first pressurized at 25 bar and fed with a gaseous mixture of carbon dioxide and nitrogen for 260 seconds. $N_2$ is adsorbed in this column, while air with a high concentration of $CO_2$ is generated from the column. Next, column (1+) is depressurized for 30 seconds and brought to a pressure of 23 bar. Simultaneously, column (1+) is connected to column (1−) such that the pressure between the two columns is equalized. The pressure of column (2−) is brought from a pressure of 12 bar to 23 bar. After, the pressure of column (1+) is held for 15 seconds at 22.7 bar. This can be accomplished by closing all of the valves in column (1+). Next, the pressure between column (1+) is equalized with column (1−) for 15 seconds, raising the pressure back up to 23 bar.

Following this step, column (1+) is depressurized to 17.4 bar and then purged using the high pressure product from column (2+). It is appreciated that the effluent from column (1+) in this step is fed to purge column (1−), which create an intermittent $CO_2$ and $N_2$ product at an intermediate pressure (17.4 bar). This illustrates the way that the present invention can purge product without using a compressor.

Column (1+) is then brought to a low pressure, of 1.3 bar, and this step takes approximately 15 seconds. Following this, column (1+) may be purged at this low pressure 45 seconds from the high pressure product of column (2+), alternatively purging could occur from stored intermittent product. Column (1+) next is brought to a pressure of 10 bar, for 5 seconds. This is accomplished by feeding column (1+) with the stream from columns (1−) and (2−) at high pressure. After this, the pressure is raised to 12 bar by equalizing the pressure of column (1+) with column (2−) for 12 seconds. Thus, the pressure of column (1+) is raised from 1.3 bar to 12 bar without using a compressor.

Column (1+) is next re-pressurized to 25 bar by connecting the column with the feed gas for 25 seconds. Afterwards, column (1+) generates highly concentrated carbon dioxide for 260 seconds during a high feed pressure step at 25 bar of pressure. Next, column (1+) is depressurized for 30 seconds and brought to a pressure of 23 bar. The pressure is held constant in column (1+) at 22.7 bar for the next 15 seconds Simultaneously, column (1+) is connecting to column (1−) such that the pressure of column (1−) can be increased. During this time period the pressure of column (1−) is brought from a pressure of 12 bar to 23 bar. After this, the pressure of column (1+) is held for 15 seconds at 23 bar. This can be accomplished by closing all of the valves of column (1+). Following this step, column (1+) is connected to column (2−). For 15 seconds, the pressure between the columns is equalized to an intermediate pressure, around 23 bar.

Following this step, column (1+) is depressurized to 17.4 bar and then purged using the high pressure product from column (2+). It is appreciated that the effluent from column (1+) in this step is fed to purge column (2−), which create an intermittent $CO_2$ and $N_2$ product at an intermediate pressure (17.4 bar). Column (1+) is then depressurized to a low pressure of 1.3 bar. This step takes approximately 15 seconds. Following this, column (1+) is purged for 45 seconds using the high pressure product of column (2+), or, alternatively, with stored intermittent product. Column (1+) can be purged without the use of a compressor. Column (1+) is then brought to a pressure of 10 bar for 5 seconds. This is accomplished by feeding column (1+) with the stream from columns (1−) and (2−) at high pressure. After this, the pressure is raised to 12 bar by equalizing the pressure of column (1+) with column (2−) for 15 seconds. Thus, the pressure of column (1+) is raised from 1.3 bar to 12 bar without the use of compressors. Finally, column (1+) is re-pressurized to 25 bar.

The cycle of column (2+) will now be described. The cycle of column (2+) commences as column (2+) is depressurized from 25 bar to 23 bar over a 30 second period. Simultaneously, column (2+) is connected to column (1−), such that the pressure of column (1−) can be increased while the pressure of column (2−) decreases. During this time period the pressure of column (2−) is brought from a pressure of 12 bar to 23 bar. After this step, the pressure of column (2+) is held for 30 seconds at 23 bar. This can be accomplished by closing all of the valves of column (2+). Following this step, column (2+) is purged using the high pressure product from column (1+). It is appreciated that the effluent from column (2+) in this step is fed to purge column (1−), which creates an intermittent $CO_2$ and $N_2$ product at an intermediate pressure. This intermittent product may be stored and used as purge gas for low-pressure purges elsewhere in the cycle using appropriate storage tanks. During this step the pressure is decreased to 10 bar.

The pressure of column (2+) is then further decreased to 1.3 bar. This step takes approximately 15 seconds. Next, column (2+) is purged at this low pressure for 45 seconds using the high pressure product of column (1+). After, column (2+) can be brought to a pressure of 10 bar for 5 seconds. This is accomplished by feeding column (2+) with the stream from columns (1−) and (2−) at high pressure and closing the other valve of column (2+). The pressure of column (2+) is further raised to 12 bar by equalizing the pressure of column (2+) with column (2−) for 15 seconds. Thus, column (2+) is purged and the pressure of column (2+) is raised from 1.3 bar to 12 bar without the use of compressors.

Column (2+) is next re-pressurized to 25 bar. Column (2+) then generates highly concentrated carbon dioxide for 260 seconds during the high feed pressure step at 25 bar of pressure. Next, column (2+) is depressurized for 30 seconds and brought to a pressure of 23 bar. Simultaneously, column (2+) is connected to column (2−) such that the pressure of the two is equalized. During this time period the pressure of column (2−) is brought from a pressure of 12 bar to 23 bar. After this equalization step, the pressure of column (2+) is held for 15 seconds at 23 bar. This can be accomplished by closing all of the valves on column (2+).

Following this step, column (2+) is purged using the high pressure product from column (1+). It is appreciated that the effluent from column (2+) in this step is fed to purge column (2−), which creates an intermittent $CO_2$ and $N_2$ product at an intermediate pressure. This intermittent product may be stored and used as purge gas for low-pressure purges elsewhere in the cycle using appropriate storage tanks. During this step the pressure is decreased to 10 bar.

Column (2+) is then depressurized to a low pressure of 1.3 bar, which takes approximately 15 seconds. Next, column (2+) is purged for 45 seconds using the high pressure feed of column (1+), or, alternatively, the stored intermittent product. Column (2+) is then brought to a pressure of 10 bar for 5 seconds. This is accomplished by feeding column (2+) with the stream from columns (1−) and (2−) at high pressure. After this, the pressure is raised to 12 bar by equalizing the pressure of column (2+) with column (1−) for 15 seconds. Thus, purging and increasing the pressure of column is accomplished without the use of compressors.

Column (2+) is next re-pressurized to 25 bar. After this, column (2+) is held at 25 bar and fed with a gaseous mixture of $CO_2$ and $N_2$ for 260 seconds. $N_2$ is adsorbed in this column, while air with a high concentration of $CO_2$ can be generated from the column. As can be seen in FIG. 3 and just described, the cycle is coordinated in such a way that either columns (2+) and (1+) are in a high pressure step producing $CO_2$, thus $CO_2$ is continuously generated.

The cycle of column (1−) will now be described. Column (1−) commences the cycle configured to column (2+) such that the pressure of column (1−) equalizes with the pressure of column (2−). In this step, the pressure of column (1−) is increased from 12 bar to 23 bar after 30 seconds. Next, the pressure of column (1−) is held at a constant 23 bar pressure for 30 seconds.

Following this, columns (1−) is fed with the purge effluent of (2+) (at 10 bar); this step create intermittent $CO_2$ and $N_2$ products at 10 bar. During this step, the pressure of column (1−) is decreased from 23 bar to 12 bar over the course of 60 seconds. This intermittent product may be stored and used as purge gas for low-pressure purges elsewhere in the cycle using appropriate storage tanks.

Column (1−) is next re-pressurized from 12 bar to 25 bar over a period of 65 seconds. After this, column (1−) is held at a pressure of 25 bar and fed with the high-pressure feed of the gaseous mixture of $CO_2$ and $N_2$ for 120 seconds. $CO_2$ is adsorbed in this column and air with a high concentration of $N_2$ is generated from the column. After this, column (1−) is depressurized to 23 bar over the course of 15 second. Column (1−) is then further depressurized to 17.4 bar and purged with the effluent of (2+) (at 17.4 bar); this step create intermittent $CO_2$ and $N_2$ products at 17.4 bar over the course of 60 seconds. This intermittent product may be stored and used as purge gas for low-pressure purges elsewhere in the cycle using appropriate storage tanks.

Column (1−) is again re-pressurized from 12 bar to 25 bar over a period of 65 seconds. After this, column (1−) is held at a pressure of 25 bar and fed with the high-pressure feed of the gaseous mixture of $CO_2$ and $N_2$ for 260 seconds. $CO_2$ is adsorbed in this column and air with a high concentration of $N_2$ is generated from the column. Column (1−) is then connected to column (2+), such that the pressure between the columns is equalized to an intermediate pressure, 12 bar. This step takes 15 seconds. Next, the pressure of column (1−) is held at a constant 23 bar pressure for 60 seconds. This occurs until column (1−) is reconnected with column (1+) such that the pressure between the columns is equalized to an intermediate pressure, 23 bar for 30 seconds. Thus, the pressure of column (1−) is raised from 12 to 23 bar without the use of compressors.

Column (1−) is then re-pressurized from 23 bar to 25 bar over a period of 15 seconds. After this, column (1−) is held at a pressure of 25 bar and fed with the high-pressure feed of the gaseous mixture of $CO_2$ and $N_2$ for 140 seconds. Column (1−) is connected with column (1+) such that the pressure between the two can equalize to 12 bar. This takes 15 seconds. Finally, the pressure in column (1−) is held for 60 seconds.

The cycle of column (2−) will now be described. Column (2−) commences the cycle in a high pressure feed step where column (2−) is held at a pressure of 25 bar and fed with the high-pressure feed of the gaseous mixture of $CO_2$ and $N_2$ for 185 seconds. $CO_2$ is adsorbed in this column and air with a high concentration of $N_2$ is generated from the column. Column (2−) is then connected to column (2+), such that the pressure between the columns is equalized to an intermediate pressure, 12 bar. This takes 15 seconds. Next, the pressure of column (2−) is held at a constant 23 bar pressure for 60 seconds. This occurs until the column (2−) is reconfigured with column (1+) such that the pressure between the columns is equalized to an intermediate pressure, 23 bar for 30 seconds. Thus, the pressure of column (2−) is raised from 12 to 23 bar without the use of compressors.

Column (2−) is then re-pressurized from 23 bar to 25 bar over a period of 15 seconds. After this, column (2−) is held at a pressure of 25 bar and fed with the high-pressure feed of the gaseous mixture of $CO_2$ and $N_2$ for 140 seconds. $CO_2$ is adsorbed in this column and air with a high concentration of $N_2$ is generated from the column. Column (2−) is then connected to column (1+), such that the pressure between the columns is equalized to an intermediate pressure, 12 bar. This takes 15 seconds. Next, the pressure of column (2−) is held at a constant 23 bar pressure for 60 seconds. This occurs until column (2−) is reconnected with column (2+), such that the pressure between the columns is equalized to an intermediate pressure of 23 bar for 30 seconds. This is briefly followed by a hold period, where the pressure remains unchanged in column (2−) for 23 seconds. Following this, columns (2−) is purged with the effluent of (2+) (at 10 bar). This step creates intermittent $CO_2$ and $N_2$ products. During this step, the pressure of column (2−) is decreased from 23 bar to 10 bar over the course of 60 seconds.

Column (2−) is next re-pressurized from 10 bar to 25 bar over a period of 65 seconds. After this, column (2−) is held at a pressure of 25 bar and fed with the high-pressure feed of the gaseous mixture of $CO_2$ and $N_2$ for 120 seconds. $CO_2$ is adsorbed in this column and air with a high concentration of $N_2$ is generated from the column. Following this step, column (2−) is connected to columns (1−) and the pressure is equalized between them to 23 bar. This takes 15 seconds. Following this, columns (2−) is depressurized to 17.4 bar and purged using the effluent of column (1−) at 17.4 bar. This takes 60 seconds and creates an intermittent $CO_2$ and $N_2$ product.

Column (2−) is then re-pressurized from 12 bar to 25 bar over a period of 65 seconds. After this, column (1−) is held at a pressure of 25 bar and fed with the high-pressure feed of the gaseous mixture of $CO_2$ and $N_2$ for 25 seconds. $CO_2$ is adsorbed in this column and air with a high concentration of $N_2$ is generated from the column. As can be seen in FIG. 3 and just described, columns (2−) and (1−) are configured in such a way that a high concentration of carbon dioxide is continuously produced throughout the cycle.

Swing Adsorber Processes—Adsorbent Materials

In various aspects, a swing adsorption process can be performed to separate $N_2$ from $CO_2$ at a temperature and pressure beneficial for other aspects of the combined power generation process. For example, the recycled exhaust gas can have a temperature from about 300° C. to about 600° C. (e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., or from about 500° C. to about 600° C.; additionally or alternately, the temperature can be at least about 325° C., e.g., at least about 350° C., at least about 400° C., at least about 425° C., or at least about 440° C.; further additionally or alternately, the temperature can be about 575° C. or less, about 550° C. or less, about 500° C. or less, about 475° C. or less, about 460° C. or less, or about 440° C. or less) and a pressure from about 10 bara (about 1.0 MPaa) to about 60 bara (about 6.0 MPaa) (e.g., a pressure of at least about 10 bara (about 1.0 MPaa), at least about 15 bara (about 1.5 MPaa), at least about 20 bara (about 2.0 MPaa), at least about 25 bara (about 2.5 MPaa), or at least about 30 bara (about 3.0 MPaa) and/or a pressure of about 60 bara (6.0 MPaa) or less, about 50 bara (about 5.0 MPaa) or less, about 40 bara (about 4.0 MPaa) or less, about 35 bara (about 3.5 MPaa) or less, about 30 bara (about 3.0 MPaa) or less, about 25 bara (about 2.5 MPaa) or less, or about 22.5 bara (about 2.25 MPaa) or less).

As noted above, one goal of the separation process can be to perform the separation under conditions compatible with the power generation process. Thus, it can be desirable to perform the separation at approximately the temperature and pressure of the recycled exhaust gas. In order to accomplish a separation at the conditions of the recycled exhaust gas, the adsorbent material in the pressure swing adsorber reactor should generally be effective under such conditions.

One example of a suitable adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

The embodiments and examples described herein are merely illustrative, as numerous other embodiments may be implemented without departing from the spirit and scope of the exemplary embodiments of the present application. Moreover, while certain features of the application may be shown on only certain embodiments or configurations, these features may be exchanged, added, and removed from and between the various embodiments or configurations while remaining within the scope of the application. Likewise, methods described and disclosed may also be performed in various sequences, with some or all of the disclosed steps being performed in a different order than described while still remaining within the spirit and scope of the present application.

The invention claimed is:

1. A method for improving power generation efficiency, comprising:

generating power by combusting fuel and producing an exhaust gas, wherein the exhaust gas includes nitrogen and carbon dioxide, passing the exhaust gas into a complementary staged swing adsorption reactor comprising at least one nitrogen adsorbent column, and at least one carbon dioxide adsorbent column;

feeding the exhaust gas into at least one of the nitrogen adsorbent column and at least one of the carbon dioxide columns at an exhaust gas feeding pressure;

adsorbing simultaneously:

the nitrogen from the exhaust gas in an adsorption cycle of the at least one nitrogen adsorbent column, the carbon dioxide from the exhaust gas in an adsorption cycle of the at least one carbon dioxide adsorbent column, depressurizing the one of the at least one nitrogen adsorbent column and the at least one carbon dioxide adsorbent column from exhaust gas feeding pressure to a first intermediate pressure;

purging another one of the at least one nitrogen adsorbent column and the at least one carbon dioxide adsorbent column while pressurized at a second intermediate pressure;

connecting the at least one nitrogen adsorbent column and the at least one carbon dioxide adsorbent column, and aligning the adsorption cycle of the at least one carbon dioxide adsorbent column with the adsorption cycle of the at least one nitrogen adsorbent column so that the first intermediate pressure and the second intermediate pressure become substantially equal.

2. The method of claim 1, wherein the columns are purged without using a steam purge.

3. The method of claim 1, wherein the columns are purged by using the exhaust feed product of another column.

4. The method of claim 1, wherein the exhaust gas pressure is 25 bar.

5. The method of claim 1, wherein
the adsorbent selective for nitrogen is selected from the group consisting of 4 A and NaA zeolite;
the adsorbent selective for carbon dioxide is selected from the group consisting of activated carbons, aluminas, metal organic framework, mixed metal oxides, hydrotalcites and combinations thereof.

6. The method of claim 1, wherein carbon dioxide product is produced containing at least 90 mol % $CO_2$ at a recovery of at least 60% and a nitrogen enriched product is produced containing at least 95 mol % $N_2$ at a recovery of at least 95%.

7. The method of claim 1; wherein the exhaust stream comprises of at least about 70 vol % $N_2$ and at least about 10 vol % $CO_2$.

8. The method of claim 1; wherein a continuous highly concentrated carbon dioxide and nitrogen product is produced at the exhaust gas pressure.

* * * * *